UNITED STATES PATENT OFFICE.

GEORGE C. BAILEY, OF WOODCLIFF-ON-HUDSON, AND AUGUSTUS E. CRAVER, OF CLIFFSIDE, NEW JERSEY, ASSIGNORS TO THE BARRETT COMPANY, A CORPORATION OF NEW JERSEY.

PROCESS OF PRODUCING FORMALDEHYDE.

1,383,059.  Specification of Letters Patent.  Patented June 28, 1921.

No Drawing.  Application filed May 26, 1920. Serial No. 384,265.

*To all whom it may concern:*

Be it known that we, GEORGE C. BAILEY and AUGUSTUS E. CRAVER, citizens of the United States, residing at (1) Woodcliff-on-Hudson, N. J., (2) Cliffside, in the counties of (1) Hudson, (2) Bergen, and State of New Jersey, have invented certain new and useful Improvements in Processes of Producing Formaldehyde, of which the following is a specification.

This invention relates to improvements in the method of producing formaldehyde from methyl alcohol by subjecting the methyl alcohol to oxidation by oxygen either alone or admixed with other gases or by means of an oxygen containing gas in the presence of a catalyzer.

The previous processes of commercial production of formaldehyde from methyl alcohol have depended upon the oxidation of a highly purified methyl alcohol in the presence of metallic catalyzers, usually in the form of a gauze, at elevated temperatures, *e. g.* from 400° C. to dark red heat.

In accordance with this invention, a partly purified methyl alcohol, or methyl alcohol containing certain impurities in appreciable quantities, may be oxidized in the presence of proper catalysts at temperatures as low as 275° C. to obtain an almost theoretical yield of formaldehyde, there being practically no combustion of the methyl alcohol or formaldehyde, thereby resulting in economy of material and cheapness of manufacture as well as increased yields.

In the previous processes it has been found that silver, gold and copper were the most suitable catalyzers for the production of formaldehyde from methyl alcohol. According to S. Fokin in the *Journal Russ. Phy. Chem. Soc.* vol. 45 p. 286 year 1913, the catalysts rank in the following order, other conditions being constant:

| Metal. | Per cent. yield of formaldehyde- |
|---|---|
| Nickel | 1.08 |
| Aluminum | 1.5 |
| Manganese | 2.01 |
| Cobalt | 2.8 |
| Platinum | 5.2 |
| Copper | 43–47 |
| Silver | 64–66 |
| Gold | 71 |
| Copper-silver | 84 |

The usual practice was to employ a copper or silver gauze, which was heated to a dull red heat from an outside source before passing through it the alcohol-air mixture, the heat of the reaction keeping the gauze at the glowing temperature. Such a process has several disadvantages, first, the gauze must be maintained at a very high temperature in order to secure an appreciable conversion; second, the time of contact of the vapors and metal must be extremely short in order to prevent very considerable or complete decomposition or oxidation of the formaldehyde, this compensating of running conditions makes the control very difficult, and even at the best, at least 20% of the charged methyl alcohol is decomposed (it has been shown—*Journal Chemical Society Transactions* year 1905, pp. 910–1916—that formaldehyde decomposes almost completely at 700° C. into hydrogen and carbon monoxid and at 450–500° C. such decomposition is very rapid); third, the different parts of the gauze vary in temperature and the actual temperature of the gauze is hard to regulate and to measure; and fourth, this type of catalyzer is quite sensitive to impurities in the alcohol and to changes in the running conditions.

According to Orloff in his book on *Formaldehyde* the optimum temperature using a copper catalyst lies at a dark red heat, although the reaction begins to be noticeable at 300° C. Le Blanc and Plaschke in *Zeit. für Elektro-chemie* vol. 17 pp. 45–84, year 1911, investigated the temperature of the catalyst, a silver gauze, and found the optimum temperature with a number of alcohol-air mixtures to be about 440–450° C. This, however, was with a laboratory apparatus and these results are not entirely representative of commercial practice.

In usual practice the ratio of alcohol and air are the same as required by the theoretical equation.

$$2CH_3OH + O_2 = 2HCHO + 2H_2O$$

or 1 gram of alcohol to 0.5 gram of oxygen. If a larger amount of oxygen is used at the high temperature a lower yield of aldehyde is obtained and a larger excess combustion results.

Furthermore, it has been necessary to employ rather pure wood alcohol for oxidation.

The presence of small quantities of acetone (0.5 to 2%) and water are detrimental to the yields. This fact has added to the expense of the usual process by making it necessary to use a wood alcohol of a purity of 98% or more and with a content of acetone less than 2%.

In the ordinary type of commercial apparatus the actual yield of formaldehyde usually runs about as follows: From 100 parts of methyl alcohol there result 150-160 parts of formaldehyde solution containing 36% formaldehyde and 12% methyl alcohol, or the theoretical yield is about 60-70%, with the rest of the alcohol decomposed. These results may vary according to the care of the operators and the design of the apparatus. Thus, according to our best knowledge of the present-day manufacture of formaldehyde, an alcohol-air mixture in ratio of 1 part methyl-alcohol to 2.5 parts air by weight, is passed over a copper gauze at a dull red heat with considerable velocity and approximately the above yields are obtained. A high degree of purity of alcohol is desirable.

By our invention we have improvements over the prior processes in that we obtain a much higher yield than heretofore obtained; we are enabled to use a much lower temperature; we can secure a more uniform and better regulated temperature of the catalyst; we materially decrease the waste caused by complete combustion of the material; and can use as much more impure methyl-alcohol than formerly used.

In practising this invention, we have discovered that an oxid of vanadium such as the pentoxid deposited on crushed pumice or other suitable carriers will produce better yields of aldehyde from methyl alcohol than the copper or silver gauze, that it is not affected by poisons such as acetone or water vapor, that it reacts at a sufficiently low temperature to be below the decomposition point of formaldehyde and that a large excess of air is beneficial to the reaction. Our improvements will be clear from a specific example.

A mixture of air and methyl alcohol in the proportion of 11.5 parts of air to 1.0 part of alcohol by weight is passed through a narrow tube heated to about 275° C. in a bath or in any other suitable manner, and partly filled with a catalyst composed of vanadium oxid impregnated on crushed pumice, at a speed equivalent to a time of contact of 0.4 second. A production of 61 parts of formaldehyde per 100 parts of methyl alcohol charged, or a theoretical yield of above 95%, is obtained, the remainder or about 32 parts of the alcohol passing through unchanged and being subsequently regained. Using a methyl alcohol containing as much as 5% of acetone approximately the same yield can be obtained, calculating the yield on the net amount of alcohol charged.

However, we are not limited by the specific description of the proportions and procedure which may be varied considerably from those of this specific example. The air-alcohol mixture may range from 5 to 20 parts of air to one part of alcohol by weight. The temperature of the catalyst may be as low as 225° C. and as high as 440° C. and favorable yields obtained depending somewhat upon other factors such as air-alcohol ratio and time of contact. In a similar way the time of contact or rate of flow of the vapors through the catalyst may be a quarter or quadruple of that given above, being dependent in turn upon the temperature and ratio.

If such a large excess of air were used with the usual type of gauze converter heretofore used substantially all of the alcohol would be burned up. At the low temperature, which we use this excess of air is very beneficial as we secure an almost theoretical yield of aldehyde from alcohol and have very small amounts of complete combustion to $H_2O$ and oxids of carbon. The fact that the oxidization of alcohol to aldehyde liberates only a small amount of heat makes the oxidation temperature easy to control in our process since the excess combustion of the alcohol and decomposition of the formaldehyde is kept very low. The reaction from methyl alcohol to formaldehyde liberates only about 31.1 kilogram calories of heat per gram molecule of alcohol oxidized. Therefore when there is practically no decomposition of the formaldehyde or complete oxidation of the alcohol to carbon dioxid and water the heat is not excessive and the temperature of the catalyst may be very easily controlled.

The low temperature (275° C.) at which our catalyst acts is a very decided advantage because oil baths may be used for heating the catalytic tubes and very close temperature regulation of the active metallic oxids may be secured. This low temperature likewise materially lessens the decomposition of the formaldehyde, after it is formed, and renders it possible to use, if necessary, a long layer of catalyst through which the material is passed thereby increasing the conversion of alcohol to aldehyde without bringing about substantial decomposition of the aldehyde or complete combustion of the alcohol.

With a catalyst of vanadium oxid water vapor and acetone in the charged alcohol do not interfere markedly with the desired reaction. This materially cheapens the cost of the production as a less highly refined wood alcohol may be used in our process instead of the methyl alcohol heretofore commonly used, which was required to be of a purity of about 98% or more for satisfactory results.

We claim:

1. The process of producing formaldehyde which comprises passing methyl alcohol in the vapor phase and an oxygen containing gas into contact with an oxid of vanadium as a catalyst at a temperature between 225° and 400° C.

2. The process of producing formaldehyde which comprises passing methyl alcohol in the vapor phase and an oxygen containing gas into contact with vanadium pentoxid as a catalyst, at a temperature between 225° and 400° C.

3. The process of producing formaldehyde which comprises passing methyl alcohol in the vapor phase and an oxygen containing gas into contact with an oxid of vanadium as a catalyst, heated to a temperature of about 275° C.

4. The process of producing formaldehyde which comprises passing methyl alcohol in the vapor phase and an oxygen containing gas into contact with vanadium pentoxid as a catalyst heated to a temperature of about 275° C.

5. The process of producing formaldehyde which comprises passing methyl alcohol containing acetone and water in the vapor phase, and an oxygen containing gas into contact with an oxid of vanadium as a catalyst at a temperature between 225° C. and 400° C.

6. The process of producing formaldehyde which comprises passing methyl alcohol containing acetone and water in the vapor phase, and an oxygen containing gas into contact with an oxid of vanadium as a catalyst, heated to a temperature of about 275° C.

7. The process of producing formaldehyde which comprises passing methyl alcohol of less than about 98% purity, in the vapor phase and an oxygen containing gas into contact with an oxid of vanadium as a catalyst at a temperature between 225° C. and 400° C.

8. The process of producing formaldehyde which comprises passing methyl alcohol in the vapor phase containing more than 1% of acetone and an oxygen containing gas into contact with an oxid of vanadium as a catalyst at a temperature between 225° C. and 400° C.

9. The process of producing formaldehyde which comprises passing about 11.5 parts of air to one part of methyl alcohol in the vapor phase into contact with an oxid of vanadium as a catalyst at a temperature between 225° C and 400° C.

10. The process of producing formaldehyde which comprises passing about 11.5 parts of air to one part of methyl alcohol in the vapor phase into contact with an oxid of vanadium as a catalyst, heated to a temperature of about 275° C.

11. The process of producing formaldehyde which comprises passing between 5 and 20 parts of air to one part of methyl alcohol in the vapor phase into contact with an oxid of vanadium as a catalyst at a temperature between 225° C. and 400° C.

12. The process of producing formaldehyde which comprises passing between 5 and 20 parts of air to one part of methyl alcohol in the vapor phase into contact with an oxid of vanadium as a catalyst, heated to a temperature of about 275° C.

In testimony whereof we affix our signatures.

GEORGE C. BAILEY.
AUGUSTUS E. CRAVER.